United States Patent

[11] 3,542,216

[72] Inventor George William Baltz
 Rte 4, Pocahontas, Arkansas 72455
[21] Appl. No. 838,840
[22] Filed July 3, 1969
[45] Patented Nov. 24, 1970

[54] METHOD OF AND APPARATUS FOR STORING AND REMOVING SILAGE
 5 Claims, 12 Drawing Figs.
[52] U.S. Cl. .................................................. 214/17, 222/271, 222/404
[51] Int. Cl. ................................................... B65g 65/48
[50] Field of Search .......................................... 214/17.8, 17.82; 222/238, 271, 404

[56] References Cited
UNITED STATES PATENTS
2,067,583 1/1937 Stark .............................. 222/404

| 2,676,694 | 4/1954 | Wyss et al. ..................... | 214/17(.8)X |
| 3,056,484 | 10/1962 | Halleux ......................... | 214/17(.8)X |
| 3,260,382 | 7/1966 | Klover .......................... | 214/17(.8) |

Primary Examiner—Robert G. Sheridan
Attorney—Hill, Sherman, Meroni, Gross & Simpson ABSTRACT: A silo including an enclosed vertical side wall, an apertured silage-supporting floor extending horizontally across the side wall and silage-loosening means for causing the silage to drop through the floor. In one embodiment the floor comprises a plurality of spaced parallel pipes equipped with radial fingers. The pipes rotatably oscillate on fixed axes. In another embodiment the floor is centrally apertured and rotates about its center. A conveyor auger is mounted on the floor to rotate therewith and to feed silage to the center aperture. In both embodiments the floor driving arrangement is outside the silage-storing zone.

Patented Nov. 24, 1970

3,542,216

INVENTOR.
GEORGE WILLIAM BALTZ

BY
ATTORNEYS

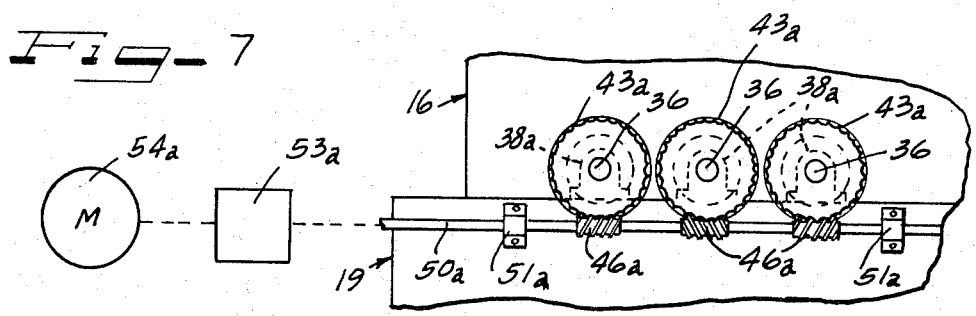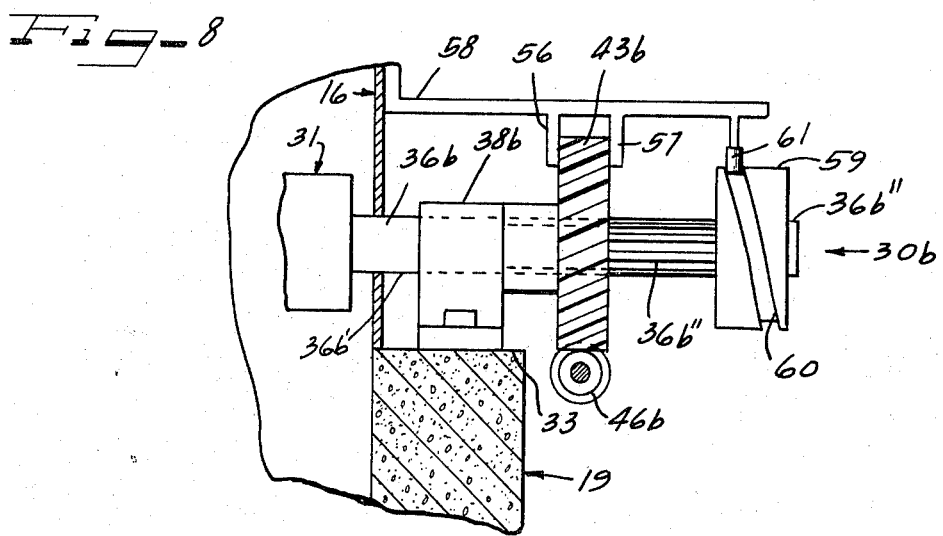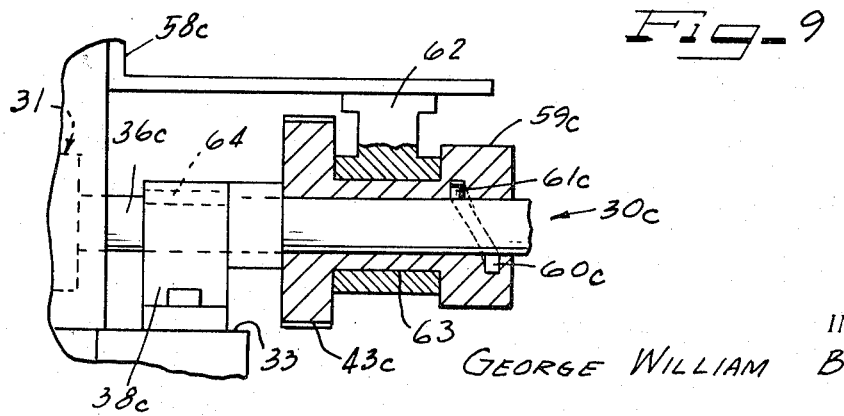

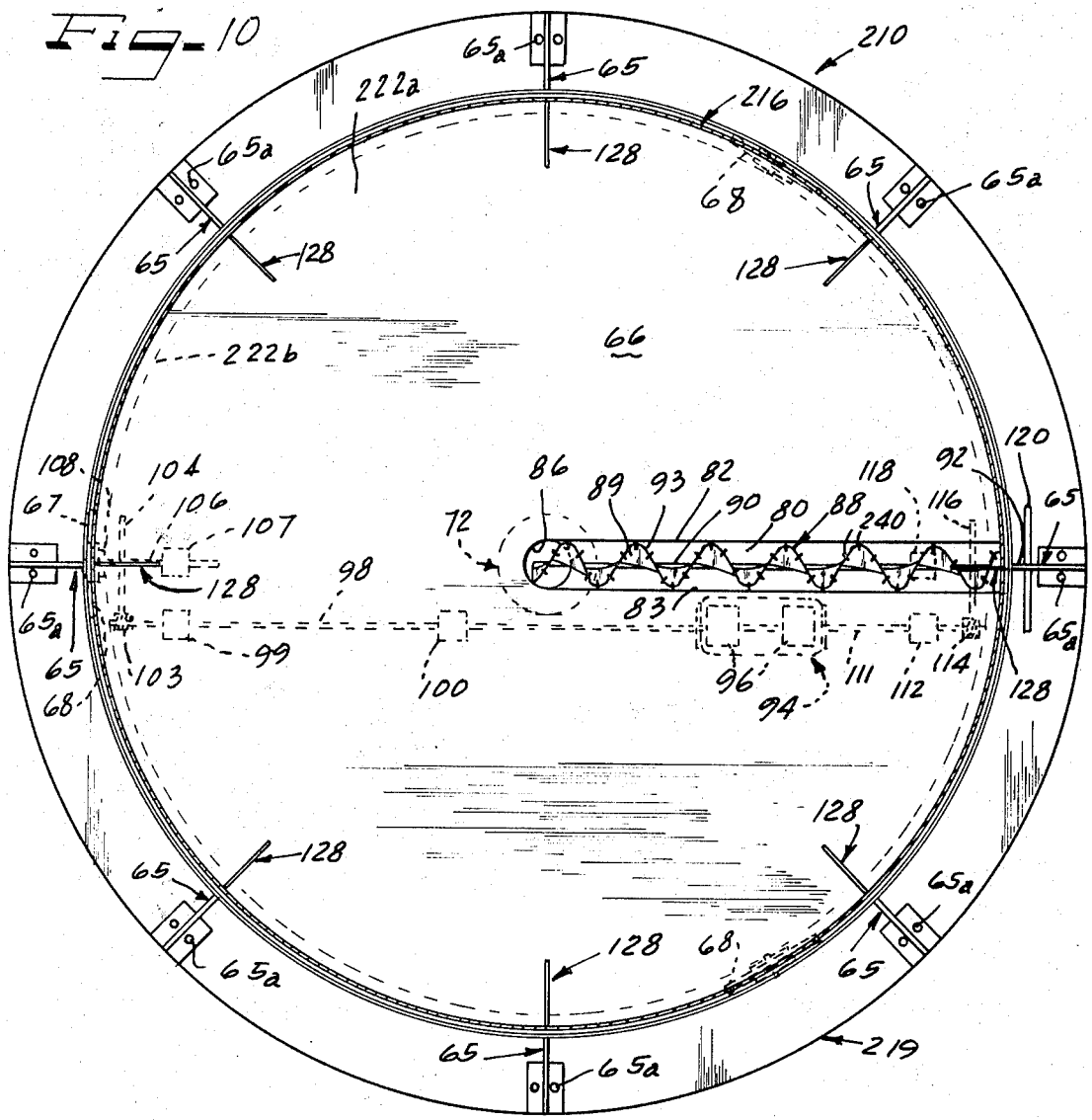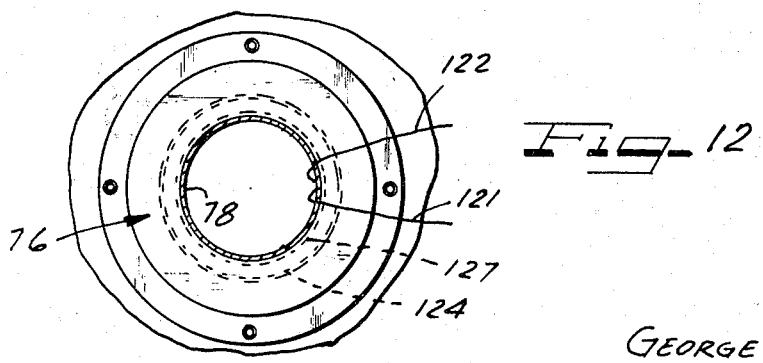

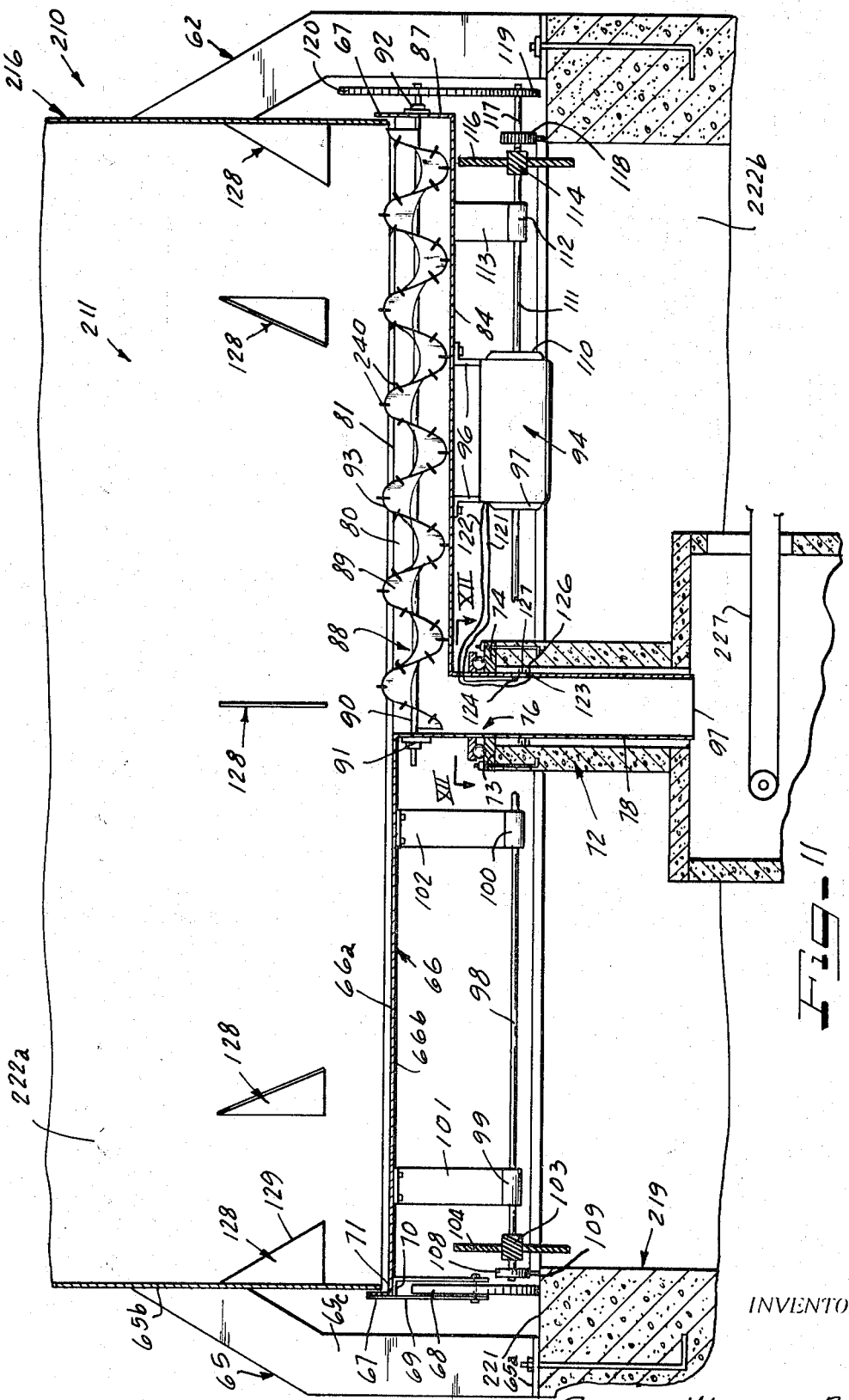

METHOD OF AND APPARATUS FOR STORING AND REMOVING SILAGE

BACKGROUND OF THE INVENTION

This invention relates generally to the field of silage-storage and removal facilities and more particularly to the field of silos having mechanical silage-removal apparatus.

In the art of silage storage the silage is generally loaded into a silage-storing facility such as an upright silo at the upper end thereof. Preferably, however, the silage is removed from the lower end of the silo to the end that the first silage in is the first silage out of the silo.

Removal of silage from the lower ends of silos has in the past been an extremely difficult and time consuming operation. In the past silage has generally been removed manually. In recent years, however, mechanical equipment has been employed for this purpose.

The mechanical silage removal equipment which has been known heretofore includes relatively complicated operating mechanisms disposed within the silo and, in the case of equipment for the preferred bottom removal operations, below the level of the silage. For example, reference is made to William Baltz U.S. Pat. Nos. 2,861,544 and 3,229,665.

Prior art removal devices generally remove the silage horizontally from the center of the silo through the side wall thereof and in most instances involve a continuous chain or the like, two sides of which slowly revolve in mutually parallel relation about the center of the silo. Whether the chain or other mechanism is disposed above the upper level of the silage or, as generally preferred, is buried at or near the lower end of the silo, the supporting surface for the silage within the silo comprises an imperforate floor, the silage being removed horizontally at some level above the floor.

Certain problems, particularly concerning repair and maintenance, have arisen in connection with prior art mechanical-removal silos. Since generally quite complicated operating mechanism is disposed within the silo, it has been found often necessary to undertake service and repair work taken therein within the silo. In arrangements wherein the removal apparatus is buried under the silage it has been necessary in some instances to completely remove all of the silage to gain access to and repair the removal apparatus.

Another difficulty which has arisen in the utilization of mechanical silage removal apparatus relates to the collection and transportation of the removed silage. In arrangements wherein the silage removal apparatus revolves about the center of the silo the silage is removed at the periphery of the silo. If the removed silage is to be collected and transported to a truck or the like vehicle for further transportation, either the truck must follow the removal apparatus about the periphery of the silo or else other means must be provided for collecting the silage as it passes through the side wall of the silo and directing it to a fixed vehicle-loading station.

Among others, it is to the elimination of these problems that have been encountered in prior art mechanical silage removal apparatus that the present invention is principally directed.

SUMMARY OF THE INVENTION

The present invention may be summarized as comprising an improved method of and apparatus for mechanically removing silage from the lower end of a silo and comprises a movable mechanical floor for supporting the silage within the silo and for enabling the silage to fall downwardly therethrough at a controlled rate to a collection hopper therebelow and means outside the silage-storage zone of the silo (and thus easily accessible for repair and maintenance purposes) for operating the mechanical floor.

In one embodiment the floor comprises a plurality of horizontally extending spaced parallel pipes journaled respectively on fixed bearing members for rotation about their respective axes. A plurality of spikes or the like silage loosening members project radially from the various pipes and ratchet and pawl means are connected to the pipes externally of the silo wall to rotatably oscillate the pipes and to cause the silage supported thereby to fall at a controlled rate downwardly through the spaces between the pipes.

In another embodiment the floor is imperforate but centrally apertured. The entire floor rotates about its vertical axis and a horizontal auger mounted on the floor loosens the silage and directs it at controlled rates to the center aperture in the floor.

A hopper is disposed below the mechanical floor for collecting the silage as it drops therethrough and means such as a conveyor or the like may be utilized to transport the fallen silage from the hopper to a silage loading station.

An object of the invention is to eliminate from within the confines of the silage-storage zone and to render more accessible the complicated silage-removal mechanisms which may require service or repair.

Another object is to eliminate the necessity for removing the silage in the event of malfunction of the silage removal driving mechanism.

Another object is to remove the silage more easily and quickly in a first in, first out silage removal system.

Another object is to reduce the expense of manufacture and operation of a mechanical silage removal system, to simplify the construction thereof and to increase the silage removal capabilities of the system.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

BRIEF DESCRIPTION OF THE DRAWING

FIG. 3 is an enlarged fragmentary side elevational view of one embodiment of a driving arrangement of the invention taken substantially along the lines III–III in FIG. 2.

FIG. 4 is an enlarged vertical sectional view of a portion of the movable floor arrangement of the invention.

FIG. 7 is a side elevational view of the floor driving arrangement illustrated in FIG. 6.

FIG. 8 is an enlarged elevational view of another embodiment of floor driving apparatus.

FIG. 9 is similar to FIG. 8 but illustrates yet another embodiment of floor driving apparatus.

FIG. 10 is a horizontal cross-sectional view of another embodiment of a silo constructed in accordance with the principles of the present invention.

FIG. 11 is a vertical sectional view taken substantially through the center of the silo disclosed in FIG. 10.

FIG. 12 is a vertical cross-sectional view taken substantially along lines XII–XII of FIG. 11.

DESCRIPTION OF THE PREFERRED EMBODIMENTS

Figure 1:
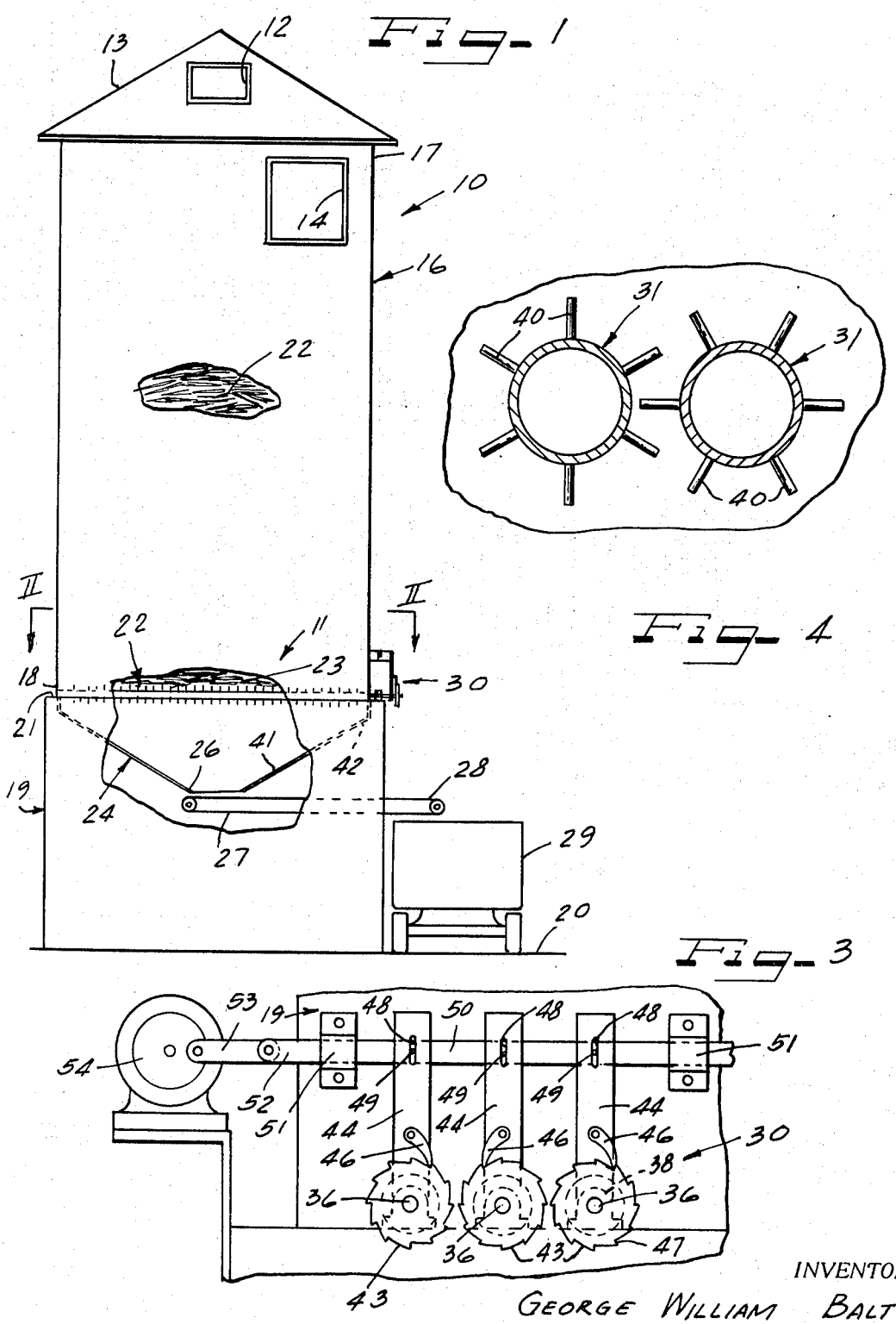
FIG. 1 is an elevational view of a silo construction illustrated partially schematically and embodying the principles of the present invention.
Figure 2:
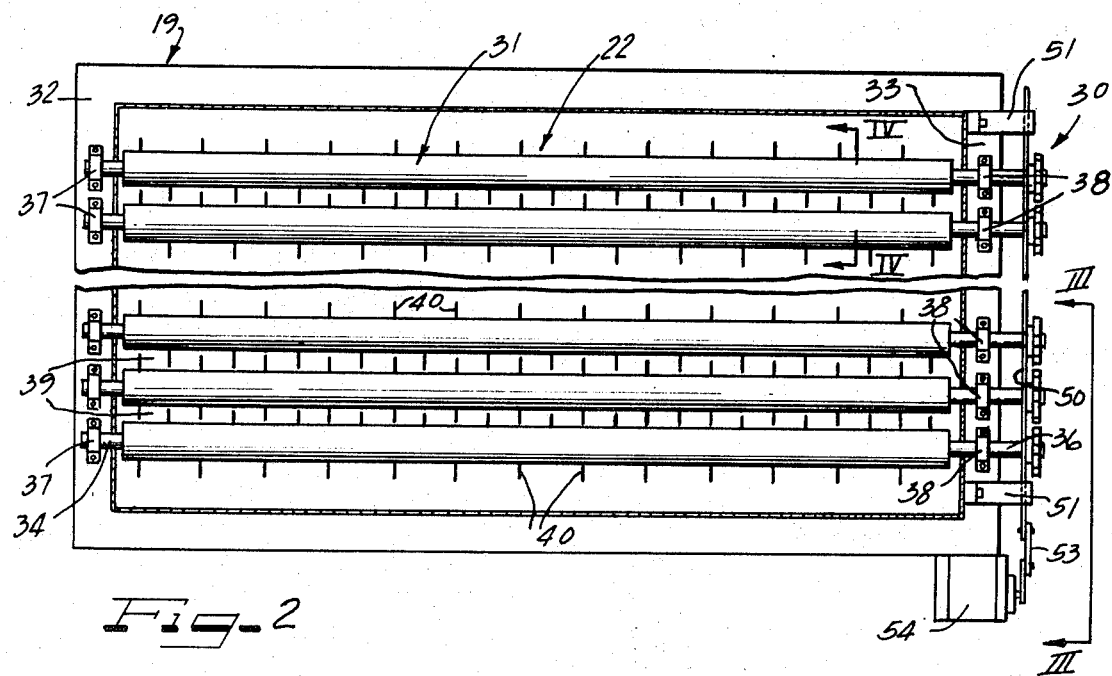
FIG. 2 is a horizontal sectional view taken along lines II–II of FIG. 1.
Figure 5:
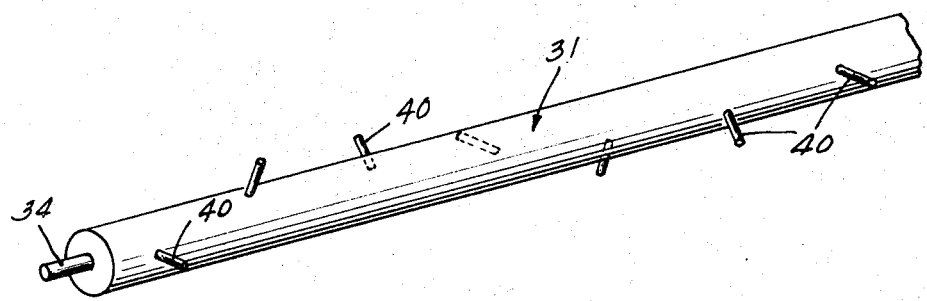
FIG. 5 is an isometric view of a floor pipe.

FIG. 1 illustrates generally schematically a silo construction indicated at reference numeral 10 equipped with mechanical silage-removal apparatus constructed in accordance with the principles of the present invention and illustrated generally at reference numeral 11.

The silo 10 is adapted for bottom removal of the silage and thus is susceptible of the preferred silage-storing arrangement whereby the first silage into the silo is the first to be removed. This arrangement ensures a steady turnover of silage and precludes unintended excessive storage period for any of the constituent pieces of silage.

The silo is charged with silage generally through an opening 12 formed in a roof member 13 or through an opening 14 formed in a vertical side wall 16 and located near an upper end 17 thereof.

A bottom end 18 of the vertical side wall 16 is supported on a foundation construction 19 preferably constructed of concrete or the like which in turn may preferably rest on a ground surface 20. Supported on a top surface 21 of the foundation 19 and extending horizontally across the lower end 18 of the vertical wall 16 is a movable floor system 22 comprising a portion of the mechanical silage removal apparatus 11.

The vertical side wall 16 may be cylindrically shaped and may rest on a cylindrically shaped foundation 19. On the other hand, the side wall 16 may be cylindrical but may rest on a rectangularly shaped foundation 19 with suitable support members such as steel plates or the like supporting the lower end 18 of the side wall 16 on the upper surface 21 of the foundation. On the other hand, the side wall 16 may be of rectangular cross-sectional configuration and may be supported on a foundation 19 of dissimilar geometry. Thus it will be appreciated that the principles of the present invention are of utility in any silo construction regardless of the cross-sectional configuration thereof. In the illustrated embodiment the vertical side wall 16 is rectangularly shaped in horizontal cross section and is supported on a correspondingly rectangularly shaped foundation 19.

The silage is stored in the silo 10 above the floor mechanism 22, that portion of the interior of the silo above the floor mechanism being conveniently referred to herein as a silage-storage chamber. The floor mechanism 22 therefore supports the silage within the silage storage chamber, which chamber is indicated at reference numeral 22a. Representative constituent pieces of silage are indicated in FIG. 1 at reference numeral 23.

In accordance with the principles of the present invention the floor mechanism 22 is so constructed and arranged that it satisfactorily supports all of the silage in the chamber 22a for storage, but during operation thereof permits constituent pieces of silage to fall by gravity downwardly therethrough at a control rate into a hopper mechanism 24, which receives all of the silage passing through the floor 22 for transportation thereof from the silo 10.

To that end the hopper 24 is provided with a bottom opening 26 through which the silage may be deposited on a conveyor system or the like indicated at reference numeral 27. The conveyor 27 may extend horizontally through the foundation 19 of the silo 10, an outermost end 28 of the conveyor 27 being referred to herein as a supply station from which the silage may be delivered to a silage receptacle or to a vehicle as indicated at reference numeral 29 by which it may be transported to a point of use. Of course, the foundation 19 may be provided with a suitable access opening so that the vehicle 29, which may take the form of a dump truck or the like, may be driven inside the foundation walls so that the silage may fall directly from the hopper opening 26 into the vehicle.

The floor mechanism 22 is constructed and arranged to include movable parts which, during operation of the floor, provide means for loosening the silage resting directly on the floor and for enabling the loosened silage to fall gravitationally through vertical openings which are formed in the floor mechanism 22.

Thus, in accordance with the principles of the present invention, the silage is not removed from the silo above the floor which supports the silage, but instead is removed through the floor itself. Furthermore, the driving or operating means for the silage removal mechanism indicated generally at reference numeral 30, is not located within the silage storage chamber 22 but instead is disposed completely externally thereof and outside the vertical side wall 16 of the silo 10.

Referring to FIGS. 1—5 the preferred embodiment of the floor mechanism 22 comprises a plurality of elongated members such as a series of cylindrical pipes 31 extending in spaced parallel relation from one top wall 32 of the foundation 19 to an opposite top wall 33. A pair of axially alined shafts 34 and 36 extend from the opposite ends of each of the pipes 31 and are journaled respectively in bearing members 37 and 38 mounted stationarily on the top foundation walls 32 and 33.

A space 39 is provided between each pair of adjacent pipes 31 and is dimensioned so as to enable the constituent pieces of silage to pass downwardly therethrough. Each of the pipes 31 is provided with a plurality of radial fingers, spikes or the like indicated at reference numeral 40 which may be advantageously arranged about the circumference of the pipes along helical paths wound respectively thereabout to the end that while the fingers 40 of each pipe are spaced axially with respect to one another they are spaced mutually circumferentially to provide a substantially helical pattern.

The shafts 34 and 36 and the bearing members 37 and 38 enable the pipes 31 to be rotated about their respective axes. Rotation of th pipes 31 causes the fingers 40 to engage and loosen the silage resting directly on the pipes 31, thus enabling the loosened silage to fall gravitationally downwardly through the openings or spaces 39 provided between the pipes 31. On the other hand, when rotation of the pipes 31 ceases the random disposition of the constituent pieces of silage resting on the pipes 31 prevents further droppage of the silage through the openings or spaces 39.

The hopper 24 comprises a hopper wall 41 which extends at an upper end 42 thereof to the far reaches of the floor 22 so as to collect all of the silage which drops through the floor and direct the same to the hopper openings 26. It will be appreciated that immediately upon discontinuance of the rotation of the pipes 31 some small quantity of silage may fall through the openings 39 until the random arrangement of the constituent pieces of silage causes complete stoppage.

In the embodiment of the invention disclosed in FIGS. 2—5 the floor driving mechanism 30 comprises a plurality of ratchets indicated respectively at reference numeral 43 which are mounted on their corresponding shafts 36 extending from the ends of the pipes 31. The ratchets 43 are mounted fast to shafts 36 for joint rotation therewith and also mounted on the shafts 36 but for relative rotation therewith are a corresponding plurality of oscillating rotating levers 44 each having a pawl 46 pivotally mounted thereon for engagement with teeth 47 formed on the periphery of their respective ratchets 43.

The levers 44 are each provided with a vertical slot 48 through which a pin 49 extends, the pin 49 projecting transversely of an elongated driving rod 50 mounted for reciprocatory rectilinear movement on the foundation 19 by means of mounting brackets or flanges as indicated at 51.

A driving end 52 of the rod 50 is connected by means of a crank mechanism 53 to a prime mover which, in the illustrated embodiment, comprises an electric motor indicated at 54. It will be appreciated, however, that other suitable mechanisms may be employed to reciprocally oscillate the rod 50 such as, for example, a pressurized hydraulic piston-cylinder arrangement. A speed reducer may also be conveniently utilized between the armature shaft of the motor 54 and the crank mechanism 53 and furthermore a gasoline engine or similar prime mover may be advantageously utilized for the motor 54. For controlling the speed of operation of the floor 22 and thus the rate of droppage of silage therethrough the motor 54 may be of the variable speed type.

Referring to FIG. 3 the pawls 46 and the teeth 47 of alternate ratchets 43 are oppositely arranged. As a consequence, movement of the rod 50 in a rightwardly of as viewed in FIG. 3 has the effect of rotating alternate ones of the pipes 31 in a clockwise direction while the remaining pipes 31 remain stationary. Conversely, movement of the rod 50 in a leftwardly direction rotates said remaining pipes in a counterclockwise direction while said alternate ones remain stationary. Thus the driving mechanism 30 has the effect of alternately rotating alternate pipes 31 in opposite directions of rotation. The speed of rotation of the pipes 31 as well as the spacing therebetween and the number and size of the fingers 40 effectively control the rate of droppage of silage through the floor 22 and into the hopper 24.

Figure 6:
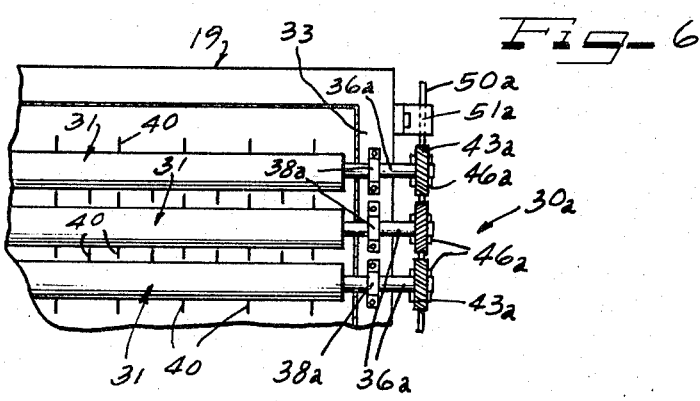
FIG. 6 is similar to FIG. 2 but illustrates another embodiment of apparatus for driving the mechanical floor.

FIGS. 6 and 7 are illustrative of another floor driving arrangement indicated generally at reference numeral $30_a$. In this embodiment an elongated shaft $50_a$ is journaled for rotation on bearing members $51_a$ and is connected by means of a speed reducer $53_a$ to a motor or the like prime mover indicated at reference numeral $54_a$.

In this embodiment a corresponding plurality of worm wheels $43_a$ are mounted fast on the shafts 36 and are driven by means of a corresponding plurality of worms $46_a$ formed on the rotating shaft or rod $50_a$. As illustrated in FIG. 7 the worm and worm wheel arrangement may be such that alternate shafts 36 are rotated simultaneously in opposite directions while the shaft $50_a$ rotates continuously in a single direction.

Of course, if desirable, the worm and worm wheels may be arranged so that all of the shafts 36 rotate in the same direction continuously but in the preferred form of the invention the alternate shafts 36 and the pipes 31 driven thereby are rotated in opposite directions.

Another embodiment of the driving mechanism for the floor 22 is illustrated in FIG. 8 and indicated generally therein at reference numeral $30_b$. In this embodiment the shafts $36_b$ which extend from the pipes 31 comprise a smooth or cylindrical portion $36_b'$ followed by a splined portion $36_b''$. A correspondingly splined worm wheel $43_b$ is mounted on each of the splined portions $36_b''$ and is restrained against axial movement by a pair of flanges 56 and 57 formed on a bracket 58 secured to the side wall 16 of the silo 10.

A worm $46_b$ is associated with each of the worm wheels $43_b$ and mounted fast on each of the shafts $36_b$ at cylindrical portions $36_b'''$ thereof and outboard of the splined portion $36_b''$ is a cylindrical cam member 59 having a helical slot 60 formed in the periphery thereof into which a stationary cam follower 61 projects, extending from the stationary bracket 58.

As a result of the cam member 60 and cam follower 61 each of the pipes 31 is oscillated axially at the same time as it is rotated. This action has the effect of increasing the rate of droppage of the silage through the openings 39 formed between the pipes 31.

Another embodiment of a driving arrangement for the floor mechanism 22 is illustrated in FIG. 9. As shown therein a driving arrangement indicated generally at reference numeral $30_c$ comprises a bracket $58_c$ similar to the bracket 58 shown in FIG. 8 on which is mounted a stationary bearing member 62.

Mounted on each of the bearing members 62 is a worm wheel $43_c$ formed integrally with a cam member $59_c$ and interconnected by means of a sleeve 63. By virtue of the arrangement of parts it will be appreciated that the worm wheel $43_c$ and the cam member $59_c$ are restrained against axial movement relative to the stationary bearing 62.

The shafts $36_c$ are keyed as illustrated at reference numerals 64 to their respective stationary bearings $38_c$ to enable the shafts $36_c$ and the pipes 31 to shift axially but to prevent rotation thereof. A cam follower $61_c$ projects radially from each of the shafts $36_c$ to ride in its respective cam groove $60_c$ whereby rotation of the worm wheels $43_c$ and the cam members $59_c$ has the effect of reciprocally oscillating the pipes 31 without causing rotation thereof. Although reciprocal movement only of the pipes 31 is not preferable in many instances it does have the effect of reducing the rate of droppage through the floor 22 and therefore may be advantageously employed in some applications.

From the foregoing it will be appreciated that the perforate movable floor mechanism 22 is of relatively simple construction and it is contemplated that no service or maintenance work whatsoever will be required thereon. The diameter and thickness of the pipes 31 as well as of the type of material such as metal of which they are constructed should be selected to be adequate to accommodate the required length thereof and the required weight of silage supported thereby with a substantial safety factor to avoid any likelihood of breakage. The fingers 40 are also sized and fastened to the pipes 31 so as to avoid any substantial possibility of breakage.

In describing the embodiment of the invention shown in FIG. 10—12 parts thereof similar to those included in the embodiments already described will be designated by similar reference numerals raised by the number 200.

In the embodiment shown in FIGS. 10—12 the vertical side wall 216 of the silo 210 is cylindrically shaped and is supported on a complementarily shaped foundation 219 by means of a plurality of uprights 65 disposed in circumferentially spaced relation about the side wall 216. A lower end $65_a$ of each of the uprights 65 rests on the top surface 221 of the foundation 219 and an upper end $65_b$ is welded or otherwise suitably connected in fixed assembly to the side wall 216.

The mechanical silage-removal apparatus 211 comprises a flat, horizontal circularly-shaped imperforate floor member 66. The diameter of the floor member 66 is slightly greater than the outer diameter of the vertical side wall 216 and an upright flange 67 fixed to the outer periphery of the floor member 66 projects upwardly outwardly of and in radially spaced relation to the vertical side wall 216.

The floor member 66 is supported on the foundation 219 for rotation about its central axis by means of a plurality of support wheels 68 disposed in radially angularly spaced relation about the periphery of the floor member 67. Each of the wheels 68 is journaled on an inverted U-shaped mounting bracket 69, an upper or bight end 70 each of which is welded or otherwise suitably connected in fixed assembly to a peripheral portion 71 of the floor member 66.

The floor member 66 is also supported for rotation in the central area thereof by means of a reduced diameter foundation or support wall 72 arranged concentrically with the outer foundation wall 219. Mounted on a top surface 73 of the support wall 72 is the lower part 74 of a bearing assembly indicated generally at reference numeral 76, an upper part 77 of which is connected fast to a tubularly shaped conduit 78 which is in turn connected to and depending downwardly from and in axially alined relation with the circular floor member 66. The conduit 78 may be constructed of the same strong, rigid material of which the floor member 66 is constructed, such as heavy gauge sheet steel or the like. In addition to providing a bearing support for the central portion of the floor member 66 the conduit 78 performs the function of conducting silage from the silage-storage chamber $222_a$ above the floor member 66 into the chamber $222_b$ therebelow. The silage may be transported by suitable means such as a conveyor system as indicated at reference numeral 27 in FIG. 1 from a lower end 79 of the conduit 78 to a delivery station outside the foundation wall 219.

In open communication with the interior of the conduit 78 is a trough 80 having a top end 81 opening directly to the silage-storage chamber $222_a$ and formed of a pair of vertical spaced parallel side walls 82 and 83 depending downwardly from the floor member 66 and interconnected at their lower ends by a horizontal bottom wall 84. With respect to the floor member 66 the trough 80 extends from a central aperture 86 which communicates with the interior of the conduit 78 radially outwardly to the periphery of the floor member 66. The radial outer end of the trough 80 is enclosed by an upright wall 87 which is alined with the upright flange 67 of the floor member 66.

Residing within a trough 80 is a horizontally extending auger 88 comprising an auger blade 89 helically wound about a shaft 90 which is journaled at one end 91 on the conduit 78 and at an opposite end 92 on the radial wall 87 of the trough 80. The outermost diameter of the trough blade 89 is greater than the vertical dimension of the trough 80 such that upper edges 93 of the blade 89 extend slightly above a top surface $66_a$ of the floor member 66. A plurality of silage-loosening fingers 240 project from the edges of the auger blade 89 and perform substantially the same function as the radial fingers 40 illustrated in the already described embodiments.

Silage is fed into the chamber $222_a$ from an upper opening formed in the silo 210, such as opening 12 or 14 shown in FIG. 1, and rests on the top surface $66_a$ of the floor member 66. To remove silage from the chamber $222_a$ the auger 88 is rotated in a direction so as move the silage engaged thereby radially inwardly to the conduit 78, through which it falls downwardly by gravity into chamber $222_b$ below the floor member 66. As the auger 88 is rotated about shaft 90 the floor member 66 is also slowly rotated about its vertical axis, which axis coincides with the longitudinal axis of the cylindrical side wall 216. During operation of the mechanism 211, therefore, silage is removed from the entire lower end of the chamber $222_a$ as the floor member 66 rotates through one complete revolution, thereby ensuring that all of the silage is removed generally on a first-in, first-out basis.

The rate of removal of silage is controlled by the speed of the auger 88 and the rate of rotation of the floor member 66. It will be appreciated, of course, that the size of the trough 80 and the auger 88 may be varied and the silage removal rate is also dependent upon these sizes.

The floor member 66 is driven by suitable motor means such as an electric motor as indicated at reference numeral 94. The motor 94 is mounted fast to the underside of the trough bottom wall 84 by means of suspension brackets 96 and moves with the floor member 66 as the latter member rotates about its axis.

Extending from one side 97 of the motor 94 is a drive shaft 98 journaled for rotation in bearing members 99 and 100 which in turn are mounted on brackets 101 and 102 fixed to and depending from the floor member 66. A worm 103 is mounted on th outboard end of the shaft 98 and meshes with a worm wheel 104 mounted fast on a shaft 106 which in turn is journaled in bearing 107 connected in fixed assembly to the floor member 66. A gear 108 is also mounted fast on shaft 106 and engages in meshing relation with a rack 109 fixed to the top 221 of the foundation wall 219 and extending circumferentially continuously therearound.

Projecting from an opposite side 110 of the motor 94 is another shaft 111 journaled in bearing member 112 which is connected in fixed assembly to the floor member 66 by means of a mounting bracket 113. A worm 114 is mounted on the outboard end of shaft 111 and engages a worm wheel 116 mounted on a shaft 117 journaled for rotation in a bearing member 115 connected in fixed assembly to the bottom wall 84 of the trough 80.

Also mounted on shaft 117 is a gear 118 identical to gear 108 which also engages in driving relation the rack 109 mounted on the foundation wall 219. Shafts 98 and 111 are both connected to the armature of the motor 94 and rotate in the same direction. Worms 103 and 114 are constructed and arranged, however, to rotate their respective worm wheels 104 and 116 in opposite directions of rotation such that the gears 108 and 118 turn together in opposite directions to rotate the entire floor assembly including the floor member 66 about its axis of rotation. It will be appreciated that while the rotation of the floor member 66 is effected by the meshing engagement of gears 108 and 118 with the rack 109, the major portion of the weight of the floor member 66 and the silage supported thereby is supported by the wheels 68.

The motor 94 is also utilized to operate the auger 88 and to that end another gear 119 is mounted on shaft 117 and engages a larger gear 120 mounted fast on the outboard end of the auger shaft 90. Thus as the floor member 66 is driven about its vertical axis at one speed the auger 88 is driven about its horizontal axis at a different speed.

The uprights 65 are bent at central portions $65_c$ to accommodate the operating gears of the silage-removal mechanism 211 and particularly gears 119 and 120 which are located radially outwardly of the side wall 216 of the silo 210.

The motor 94 may be supplied with electric power through any suitable means which, in the exemplary embodiment illustrated in the drawings, comprises a pair of wires 121 and 122 extending respectively from terminals on the motor 94 to a pair of axially spaced annularly shaped commutator rings 123 and 124 mounted on and insulated from the tubular conduit 78. A corresponding pair of stationary commutator rings 126 and 127 are mounted on the foundation wall 72 and may be energized from any suitable source of electric power. It will be appreciated that the electrical wiring illustrated in FIGS. 10—12 is merely schematic and for illustrative purposes only.

The silage in the chamber $222_a$ may weigh many tons, as will be understood by those skilled in the art. In accordance with the principles of the present invention the floor member 66 is relieved of a great portion of the weight of the silage. Otherwise it would be necessary that the floor member 66, the wheels 68 and the bearing 76 be constructed so as to accommodate this exceptionally heavy weight.

Furthermore, if the entire weight of the silage were to be borne by the floor member 66 the silage would have a tendency to rotate with the floor member 66 rather than remain stationary within the silo 210. Of course, if the silage were to rotate with the floor member 66 the auger 88 would merely remove a "tunnel" of silage and thereafter be rendered ineffective.

In order to remove a substantial portion of the weight of the silage from the floor member 66 and to prevent rotation of the silage along with the floor member 66 the present invention contemplates the provision of means for transmitting the weight of the silage directly from the side wall 216 to the uprights 65 and thence to the foundation 219. In addition means are provided for preventing rotation of the silage relative to the vertical side wall 216.

In the embodiment illustrated herein such means comprises a series of vertical plates 128 which are welded or otherwise fixedly connected to the inner surface of the vertical side wall 216. The plates 128 illustrated are triangularly shaped and each includes a downwardly and radially inwardly extending edge sloping support wall 219.

The silage within chamber $222_a$ is generally heavily compacted and may be considered for purposes of the present invention as comprising a single mass. The edges 129 of the plates 128, which are mounted in proximately spaced relation above the floor member 66, cut into and tend to support the entire mass of silage except for that portion thereof which is disposed between the plates 128 and the floor member 66. The weight of the silage is therefore transmitted from the plates 128 to the silo side wall 216 and thence to the uprights 65 and to the foundation wall 219.

In addition to supporting a substantial portion of the weight of the silage the plates 128 perform the salutary function of restraining the silage against rotation. As the mass of silage moves downwardly in the chamber $228_a$ upon operation of the removal apparatus 211 the edges 129 cut into the silage and actually prevent rotation of the silage relative to the silo side wall 216.

The size and spacing of the plates 128 may vary in accordance with the size and capacity of the silo 210. In the embodiment illustrated a total of eight plates 128 are spaced at 45° intervals about the side of wall 216. If the weight of the silage requires greater support it will generally be more preferable to increase the number of plates 128 rather than the thickness thereof since, if the thickness of the plates becomes excessive, the plates themselves will prevent downward movement of the silage. Stated differently, the thicknesses of the individual plates 128 must be sufficient to support the weight of the silage in chamber $222_a$ to a great extent, but nonetheless the plates should not be so thick as to preclude a cutting or cleavage action of the edges 129 through the silage to enable the silage to move downwardly at a rate corresponding to the rate of silage removal.

It is noted that in the embodiment shown in FIGS. 10—12 as well as in the previously described embodiments substantially the entire floor driving or operating apparatus is situated outside the silage-storage chamber and is completely accessible for maintenance or repair purposes. Furthermore the present invention increases the rate of removal of silage relative to heretofore known systems and reduces the forces acting on the constituent pieces of silage relative to the previously known mechanical removal systems.

Although minor modifications might be suggested by those versed in the art, it should be understood that I wish to embody within the scope of the patent warranted hereon all such modifications as reasonably come within the scope of my contribution to the art.

I claim:

1. A mechanical silage-removal silo comprising:
means forming a vertical side wall enclosing a silage-storing chamber;
means supporting said side wall;
operable silage-supporting floor means comprising a plurality of individual elongated members extending across the bottom of said chamber in mutually spaced parallel relation to provide therebetween vertical openings through which the silage may fall and means on said members forming silage-loosening fingers for engaging and loosening the silage immediately above said members;
means located outside said chamber and operatively connected to said floor means for causing movement thereof to loosen the silage;
silage-receiving means disposed below said floor means for receiving silage falling through said openings; and
journal means for individually journaling said members for rotational and axial movement, said floor operating means comprising means for rotating and simultaneously axially oscillating said members.

2. A mechanical silage-removal silo comprising:
means forming a vertical side wall enclosing a silage-storing chamber;
means supporting said side wall;
operable silage-supporting floor means comprising a plurality of individual elongated members extending across the bottom of said chamber in mutually spaced parallel relation to provide therebetween vertical openings through which the silage may fall and means on said members forming silage-loosening fingers for engaging and loosening the silage immediately above said members;
means located outside said chamber and operatively connected to said floor means for causing movement thereof to loosen the silage;
silage-receiving means disposed below said floor means for receiving silage falling through said openings; and
means mounting said members for individual axial movement, said floor operating means comprising means for axially oscillating said members.

3. A mechanical silage-removal silo comprising:
means forming a vertical side wall enclosing a silage-storing chamber;
means supporting said side wall;
floor means extending across the bottom of the chamber for supporting silage, said floor means comprising a plurality of elongated horizontally extending pipes arranged in spaced parallel relation to one another to provide silage-passing openings therebetween; and
means for journaling said pipes for rotation about their respective axes and silage-loosening members projecting radially from said pipes; floor operating means connected to said pipes for rotating same, and hopper means below said floor means for receiving silage as it falls downwardly through said openings, said floor operating means comprising cam and cam follower means operatively associated with said pipes for reciprocally axially oscillating said pipes.

4. The invention as defined in claim 3, wherein said cam and cam follower means is constructed and arranged to oscillate alternate pipes in opposite directions.

5. A mechanical silage-removal silo comprising:
means forming a vertical side wall enclosing a silage-storing chamber;
means supporting said side wall;
floor means extending across the bottom of the chamber for supporting silage, said floor means comprising a plurality of elongated horizontally extending pipes arranged in spaced parallel relation to one another to provide silage-passing openings therebetween, means for journaling said pipes for rotation about their respective axes and silage-loosening members projecting radially from said pipes;
floor operating means connected to said pipes for rotating same; and
hopper means below said floor means for receiving silage as it falls downwardly through said openings, said floor operating means comprising means for simultaneously rotating and axially oscillating alternate ones of said pipes in opposite directions.